(12) United States Patent
Ochi et al.

(10) Patent No.: US 10,120,123 B2
(45) Date of Patent: Nov. 6, 2018

(54) CONTAINER CASE AND LIQUID CRYSTAL DISPLAY DEVICE WITH THE SAME

(71) Applicant: Japan Display Inc., Tokyo (JP)

(72) Inventors: Tetsuro Ochi, Tokyo (JP); Hiroyuki Sakakura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/183,536

(22) Filed: Jun. 15, 2016

(65) Prior Publication Data

US 2017/0038523 A1   Feb. 9, 2017

(30) Foreign Application Priority Data

Aug. 7, 2015   (JP) ................. 2015-157398

(51) Int. Cl.
  *F21V 8/00*      (2006.01)
  *G02F 1/1333*    (2006.01)
  *G02F 1/1335*    (2006.01)

(52) U.S. Cl.
  CPC ......... *G02B 6/0088* (2013.01); *G02B 6/0055* (2013.01); *G02F 1/133528* (2013.01); *G02F 1/133308* (2013.01); *G02F 2001/133314* (2013.01)

(58) Field of Classification Search
  CPC ... G02F 1/133308; G02F 2001/133311; G02F 2001/133314; G02F 2001/133317; G02F 2001/13332; G02F 2001/133325; G02F 2001/133328; G02F 2001/133331; G02B 6/0086; G02B 6/0088
  See application file for complete search history.

(56) References Cited

U.S. PATENT DOCUMENTS

| 2007/0126335 | A1* | 6/2007 | You | G02B 6/0081 |
| | | | | 313/485 |
| 2008/0303972 | A1* | 12/2008 | Han | G02F 1/13452 |
| | | | | 349/58 |
| 2009/0147172 | A1* | 6/2009 | Byoun | G02F 1/133605 |
| | | | | 349/58 |
| 2010/0142128 | A1* | 6/2010 | Takechi | G02F 1/133308 |
| | | | | 361/679.01 |
| 2011/0285934 | A1 | 11/2011 | Watanabe | |
| 2016/0109906 | A1* | 4/2016 | Trutna | G02F 1/133308 |
| | | | | 361/747 |
| 2016/0266433 | A1* | 9/2016 | Zhou | G02F 1/133308 |
| 2017/0038522 | A1* | 2/2017 | Zeng | G02B 6/0051 |

FOREIGN PATENT DOCUMENTS

| JP | 2010-026216 A | 2/2010 |
| JP | 5122657 B2 | 11/2012 |
| WO | 2010/089998 A1 | 8/2010 |

\* cited by examiner

*Primary Examiner* — Jessica M Merlin
(74) *Attorney, Agent, or Firm* — Michael Best & Friedrich LLP (57) ABSTRACT

According to one embodiment, a container case accommodating an optical member includes a bottom wall, sidewalls provided to stand along side edges of the bottom wall, and flanges extending from the sidewalls. The container case is formed of a reflective sheet or reflective film.

10 Claims, 10 Drawing Sheets

CONTAINER CASE AND LIQUID CRYSTAL DISPLAY DEVICE WITH THE SAME

CROSS-REFERENCE TO RELATED APPLICATIONS

This application is based upon and claims the benefit of priority from Japanese Patent Application No. 2015-157398, filed Aug. 7, 2015, the entire contents of which are incorporated herein by reference.

FIELD

Embodiments described herein relate generally to a container case accommodating an optical member, and a liquid crystal display device comprising the same.

BACKGROUND

In recent years, liquid crystal display devices have come to be widely used in smartphones, personal digital assistants (PDAs), tablet computers, satellite navigation systems, etc. In general, a liquid crystal display device comprises a liquid crystal display panel and a surface illumination device which is overlaid on the rear surface of the liquid crystal display panel and illuminates the liquid crystal display panel. An example of the surface illumination device is a backlight unit including a reflective layer, a lightguide plate (lightguide), an optical sheet, a light source such as LEDs, and a rectangular resin frame. The reflective layer, the lightguide plate, and the optical sheet are stacked on each other, and fitted into the resin frame. The peripheries of the reflective layer, the lightguide plate, and the optical sheet are thereby supported and positioned.

Alternatively, there has been proposed a backlight unit in which a resin frame is fitted into a container case made of a metal plate, and further, a reflective layer, a lightguide plate, and an optical sheet are disposed in the cavity of the resin frame.

In recent years, as display areas have increased, there has been a continual demand for the frames of liquid crystal display devices to become ever narrower and the liquid crystal display devices to become ever thinner. However, the above-described backlight unit including the resin frame is approaching the structural limit of the resin frame, and it is hard to meet the demand for further reduction in thickness and further narrowing of the frame.

DETAILED DESCRIPTION

Various embodiments will be described hereinafter with reference to the accompanying drawings. In general, according to one embodiment, a container case accommodating an optical member comprises a bottom wall, sidewalls provided to stand along edges of the bottom wall, and flanges extending from the sidewalls, and is formed of a reflective sheet or reflective film.

The disclosure is merely an example, and proper changes within the spirit of the invention, which are easily conceivable by a person with ordinary skill in the art, are included in the scope of the invention as a matter of course. In addition, in some cases, in order to make the description clearer, the widths, the thicknesses, the shapes, etc., of the respective parts are schematically illustrated in the drawings, compared to the actual modes. However, the schematic illustration is merely an example, and adds no restrictions on the interpretation of the present invention. Further, in the specification and drawings, the same elements as those described in connection with preceding drawings are given the same reference numbers, and a detailed description thereof is omitted as appropriate.

(First Embodiment)

Figure 1:
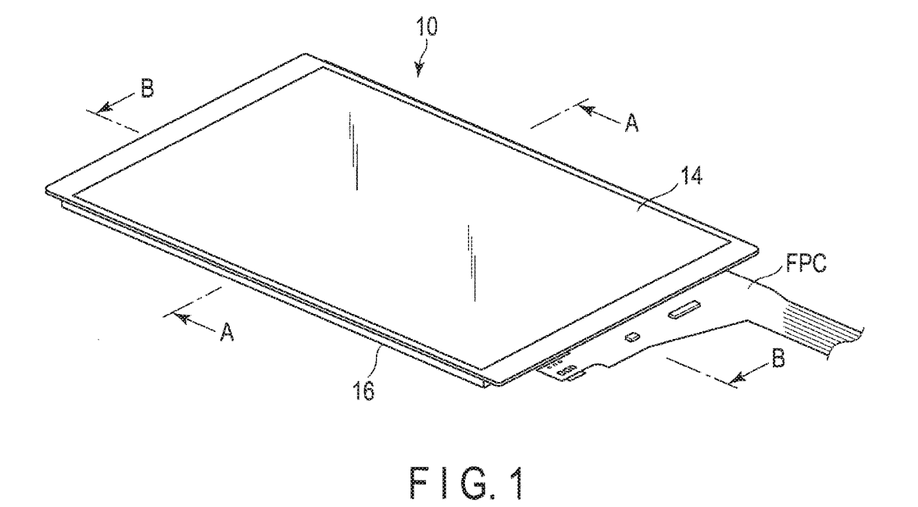
FIG. 1 is a perspective view showing a display surface side of a liquid crystal display device according to a first embodiment.
Figure 2:
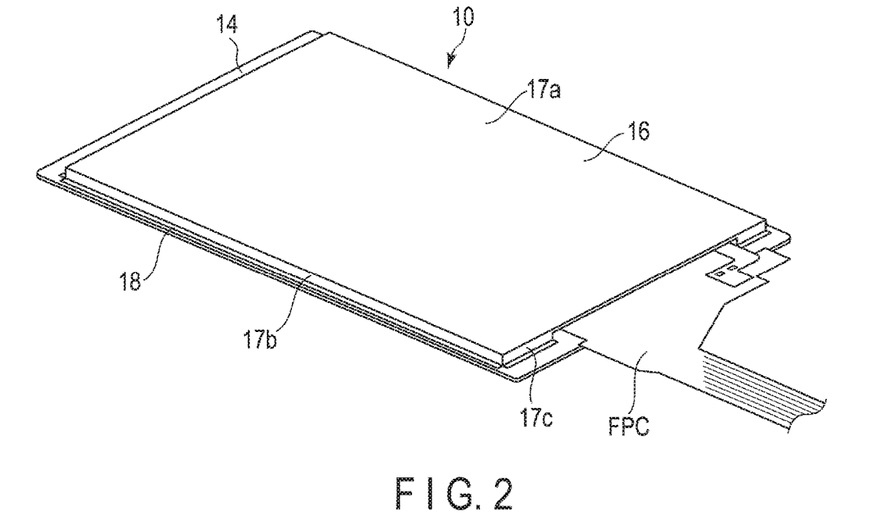
FIG. 2 is a perspective view showing a rear surface side of the liquid crystal display device.
Figure 3:
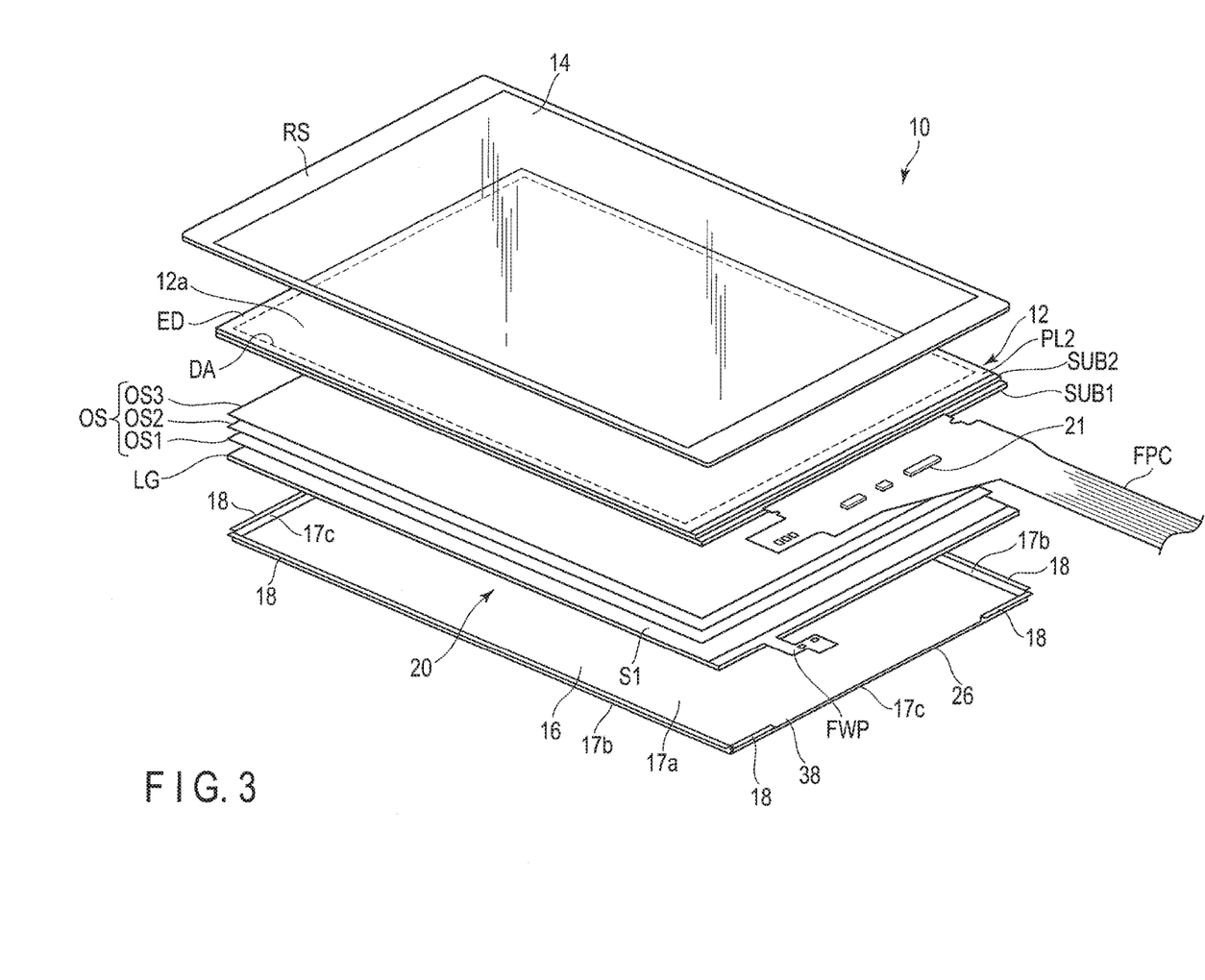
FIG. 3 is an exploded perspective view of the liquid crystal display device.

FIG. 1 and FIG. 2 are perspective views showing a display surface side and a rear surface side of a liquid crystal display device according to a first embodiment, respectively. FIG. 3 is an exploded perspective view of the liquid crystal display device.

A liquid crystal display device 10 can be incorporated into various electronic devices, for example, a smartphone, a tablet computer, a feature phone, a notebook computer, a portable game console, an electronic dictionary, a television set, and a satellite navigation system.

As shown in FIG. 1 to FIG. 3, the liquid crystal display device 10 comprises an active-matrix liquid crystal display panel 12, a transparent cover panel 14 which is overlaid on a display surface 12a of the liquid crystal display panel 12 and covers the whole display surface, and a backlight unit 20 as a surface illumination device opposed to the rear surface side of the liquid crystal display panel 12. The backlight unit 20 comprises a container case 16 which is fixed to the cover panel 14 and covers the rear surface side of the liquid crystal display device 12, and optical members which are disposed in the container case 16 and opposed to the rear surface of the liquid crystal display panel 12.

Figure 4:
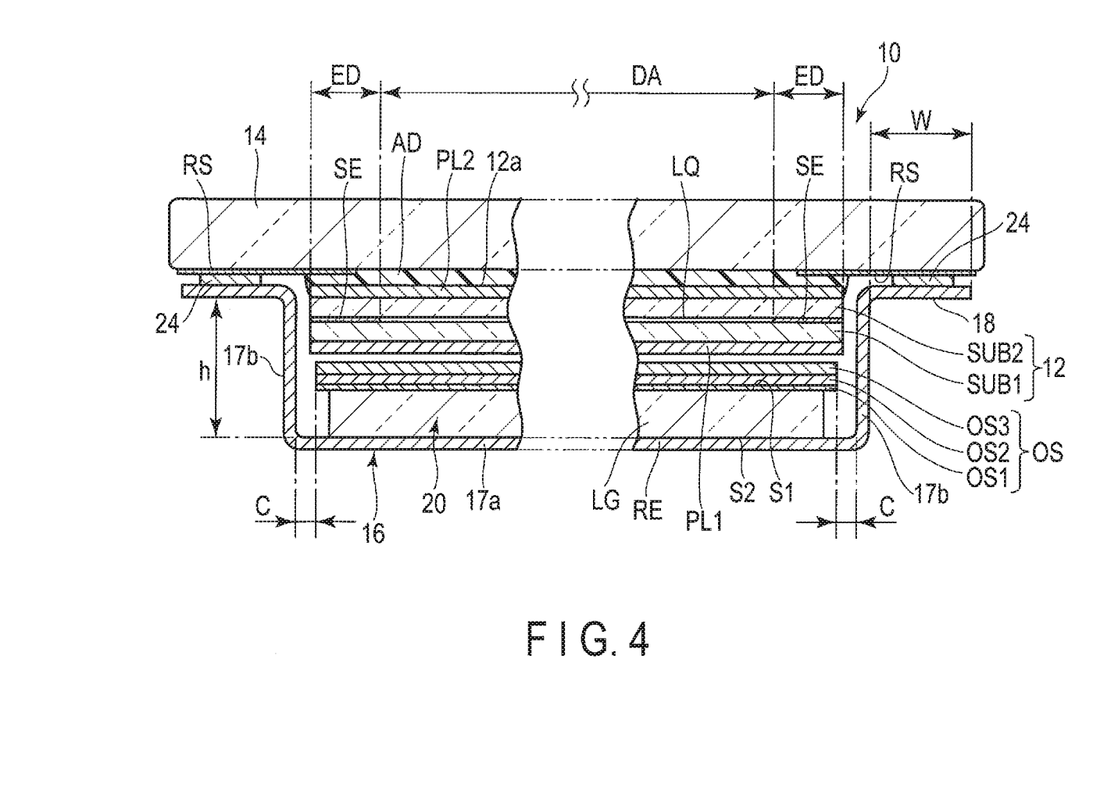
FIG. 4 is a sectional view of the liquid crystal display device taken along line A-A of FIG. 1.
Figure 5:
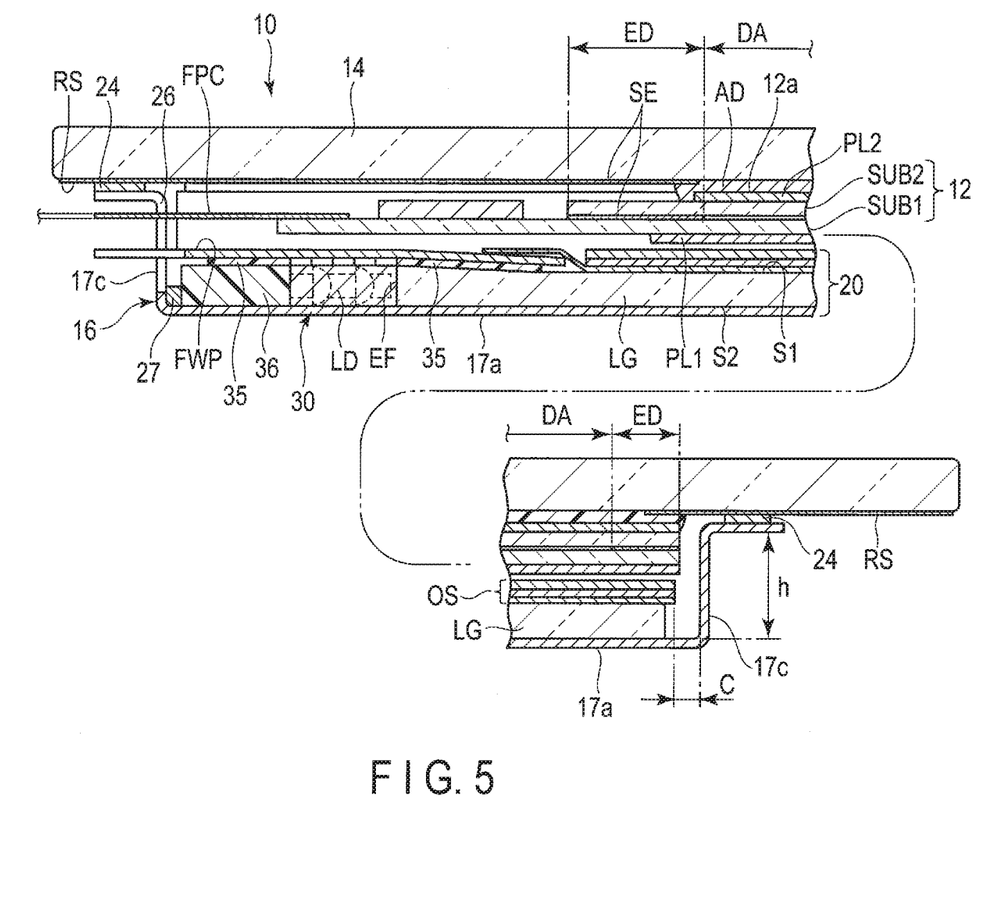
FIG. 5 is a sectional view of the liquid crystal display device taken along line B-B of FIG. 1.

FIG. 4 is a sectional view of the liquid crystal display device taken along line A-A of FIG. 1, and FIG. 5 is a sectional view of the liquid crystal display device taken along line B-B of FIG. 1. As shown in FIG. 3 to FIG. 5, the liquid crystal display panel 12 comprises a first substrate SUB1 in the shape of a rectangular plate, a second substrate SUB2 in the shape of a rectangular plate opposed to the first substrate SUB1, and a liquid crystal layer LQ held between the first substrate SUB1 and the second substrate SUB2. The periphery of the second substrate SUB2 is affixed to the first substrate SUB1 with a sealing member SE. A polarizer PL2 is attached to the surface of the second substrate SUB2 to form the display surface 12a of the liquid crystal display panel 12. A polarizer PL1 is attached to the surface of the first substrate SUB1 (the rear surface of the liquid crystal display panel 12).

The liquid crystal display panel 12 includes a rectangular display area (active area) DA where an image is displayed in the area surrounded by the sealing member SE, and a frame area ED in the shape of a rectangular frame located around the display area DA. The liquid crystal display panel 12 is of a transmissive type which has a transmissive display function of displaying an image by selectively transmitting light from the backlight unit 20. As a display mode, the liquid crystal display panel 12 may primarily include a structure corresponding to a lateral electric field mode in which a lateral electric field substantially parallel to a main surface of a substrate is used, or may primarily include a structure corresponding to a longitudinal electric field mode in which a longitudinal electric field substantially perpendicular to the main surface of the substrate is used.

In the shown example, a flexible printed circuit FPC is joined to the first substrate SUB1. On the flexible printed circuit FPC is mounted a semiconductor element, such as a driving IC chip 21, as a signal supply source which supplies a signal necessary to drive the liquid crystal display panel 12. The flexible printed circuit FPC extends, for example, from the short side of the first substrate SUB1 to the outside of the liquid crystal display panel 12.

As shown in FIG. 1 to FIG. 5, the cover panel 14 is, for example, formed of a glass plate or an acrylic transparent resin and in the shape of a rectangular plate. The cover panel 14 has greater dimensions (width and length) than those of the liquid crystal display panel 12, and a larger area than that of the liquid crystal display panel in a plan view. The lower surface (back surface) of the cover panel 14, for example, is attached to the display surface 12a of the liquid crystal display panel 12 with a transparent adhesive AD, and covers the whole surface of the liquid crystal display panel 12. The periphery of the cover panel 14 projects further outward than the outer periphery of the liquid crystal display panel 12. Each of the long sides of the cover panel 14 is substantially parallel to the associated long side of the liquid crystal display panel 12, and is a predetermined distance from the associated long side.

Each of the short sides of the cover panel 14 is substantially parallel to the associated short side of the liquid crystal display panel 12, and is a predetermined distance from the associated short side. In the present embodiment, the distance between each long side of the cover panel 14 and each associated long side of the liquid crystal display panel 12, that is, the width of the periphery on the long sides of the cover panel 14, is less than the distance between each short side of the cover panel 14 and each associated short side of the liquid crystal display panel 12, that is, the width of the periphery on the short sides of the cover panel 14.

A light-shielding layer RS having an opening associated to the display area DA is formed on the lower surface (the back surface, or the surface on the liquid crystal display panel side) of the cover panel 14. On the cover panel 14, an area other than that opposed to the display area DA of the liquid crystal display panel 12 is shielded from light by the light-shielding layer RS. The light-shielding layer RS may be formed on the upper surface (outer surface) of the cover panel 14.

Figure 6:
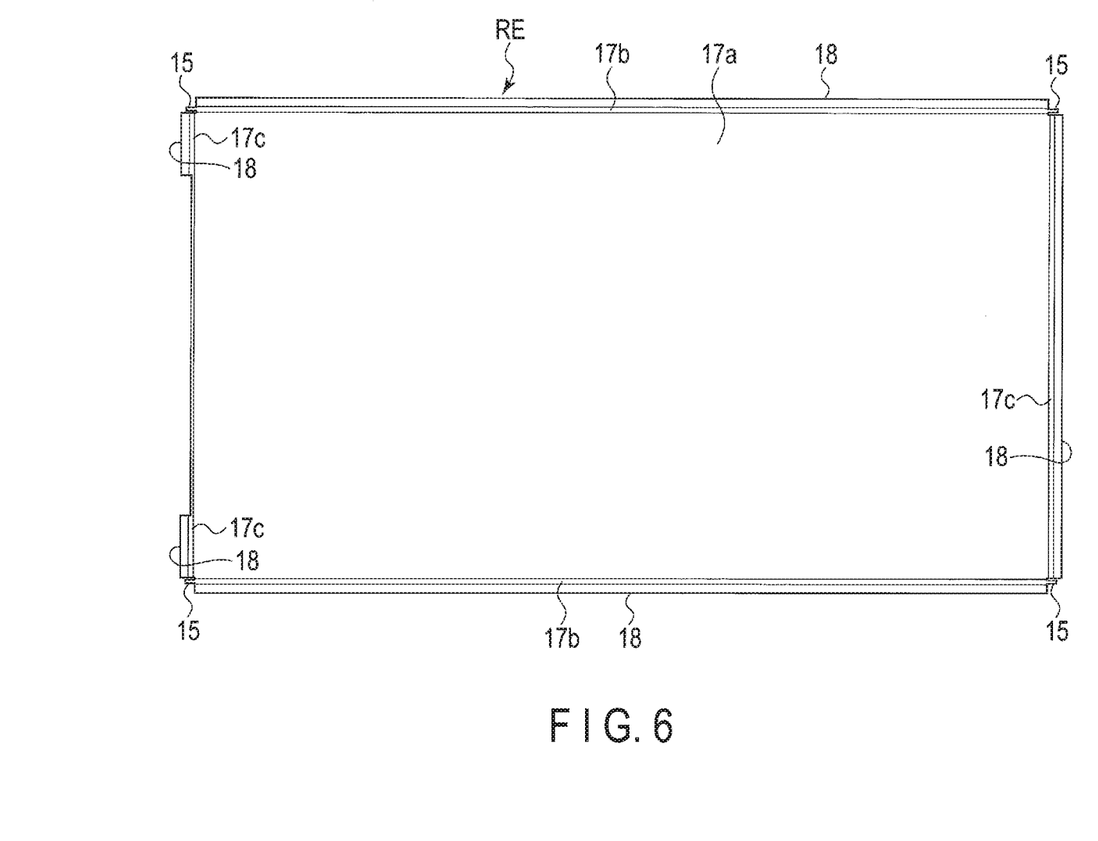
FIG. 6 is a developed plan view showing a container case of the liquid crystal display device.
Figure 7:
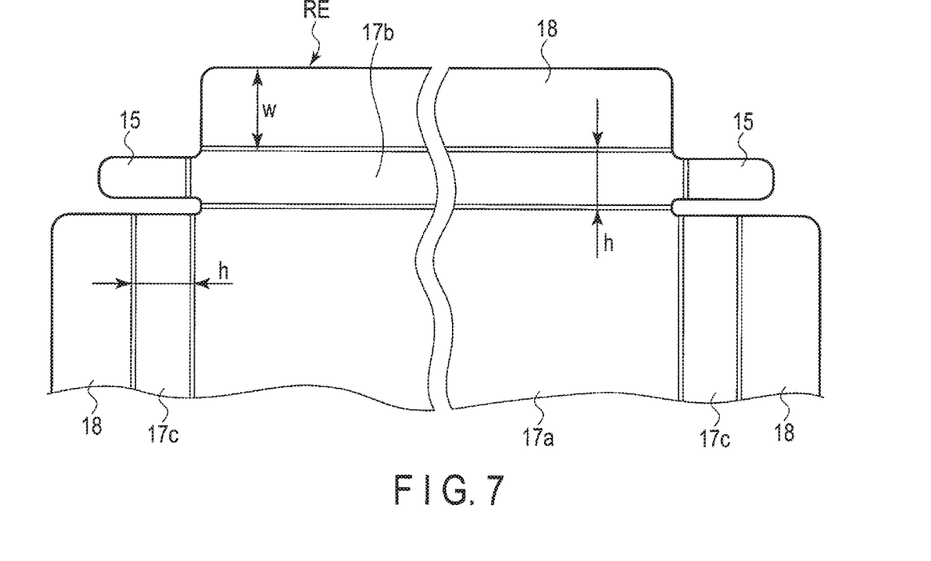
FIG. 7 is an enlarged plan view showing a part of the developed container case.

The container case 16 of the backlight unit 20 is formed as a flat rectangular tray (rectangular lid) by bending or vacuum-forming a reflective sheet or reflective film having a film thickness of 200 μm or less, preferably 50 to 90 μm, and reflectivity of 90% or more, preferably 95% or more. FIG. 6 is a developed plan view showing a reflective sheet forming the container case 16. FIG. 7 is an enlarged plan view showing a corner portion of the reflective sheet. As a reflective sheet RE, for example, a reflective sheet which has a multilayered film structure formed of a polyester resin and has a film thickness of 65 to 82 μm and reflectivity of 98% or more is used. The reflective sheet RE comprises a rectangular bottom wall 17a having dimensions (length and width) greater than those of the liquid crystal display panel 12 but less than those of the cover panel 14, sidewalls 17b and 17c in the shape of strip connecting with the respective side edges of the bottom wall 17a, and flanges 18 in the shape of strip continuously extending from the upper edges of the respective sidewalls. Central portions in a longitudinal direction of the sidewall 17c and the flange 18 on one short side are cut out to form an opening portion 26. Moreover, the reflective sheet RE comprises two tongue portions (marginal portions) 15 projecting from both ends in the longitudinal direction of each of the sidewalls 17b on the long side.

Figure 8:
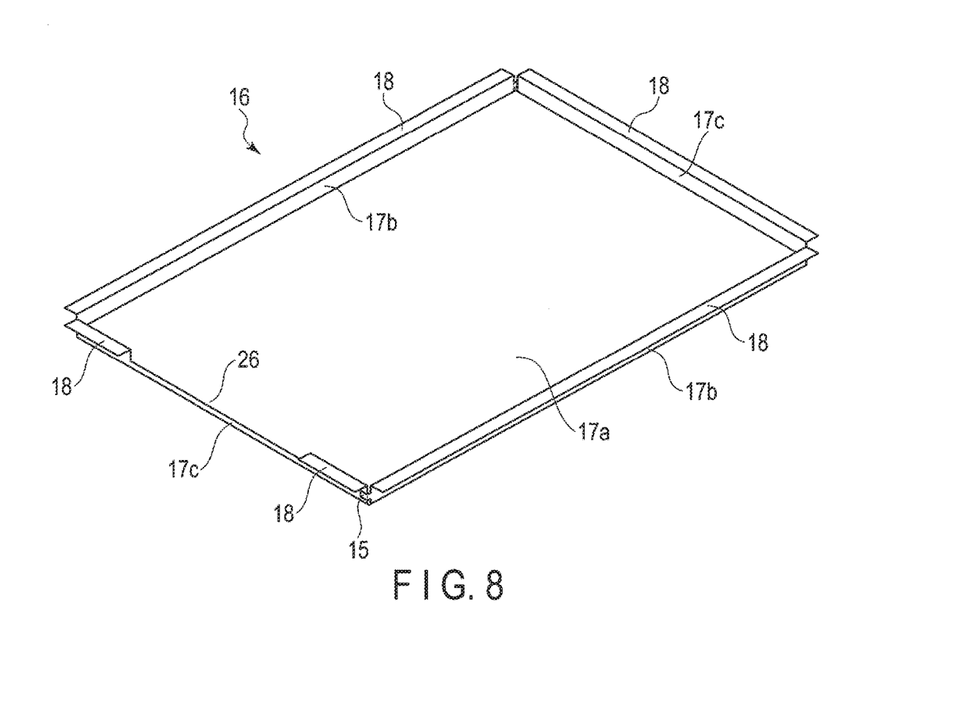
FIG. 8 is a perspective view showing the container case of the liquid crystal display device.
Figure 9:
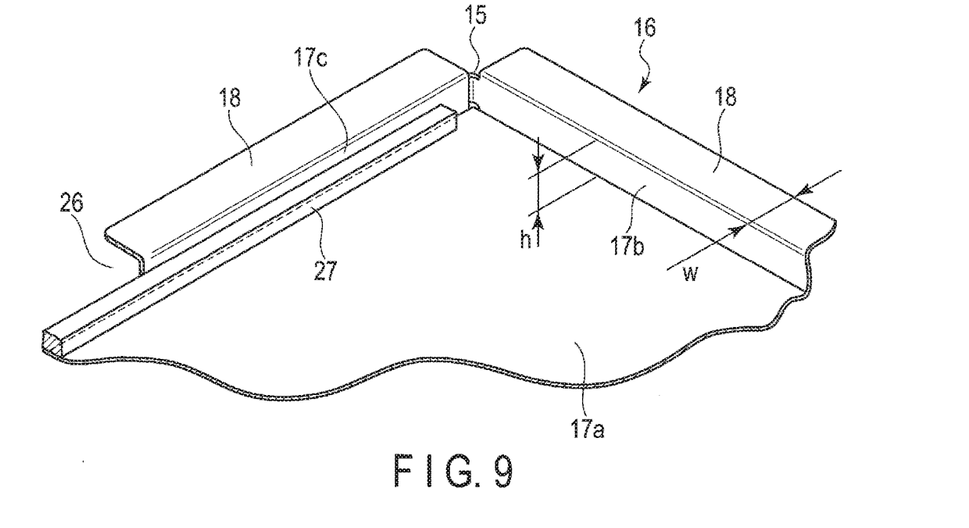
FIG. 9 is an enlarged perspective view showing a corner portion of the container case of the liquid crystal display device.
Figure 10:
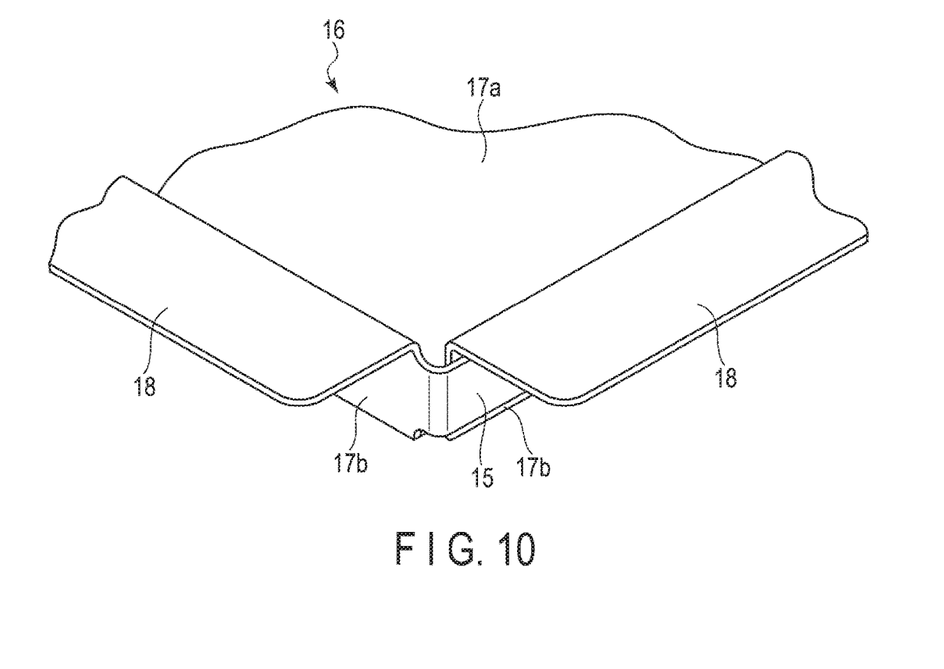
FIG. 10 is an enlarged perspective view showing the corner portion of the container case of the liquid crystal display device.
Figure 11:
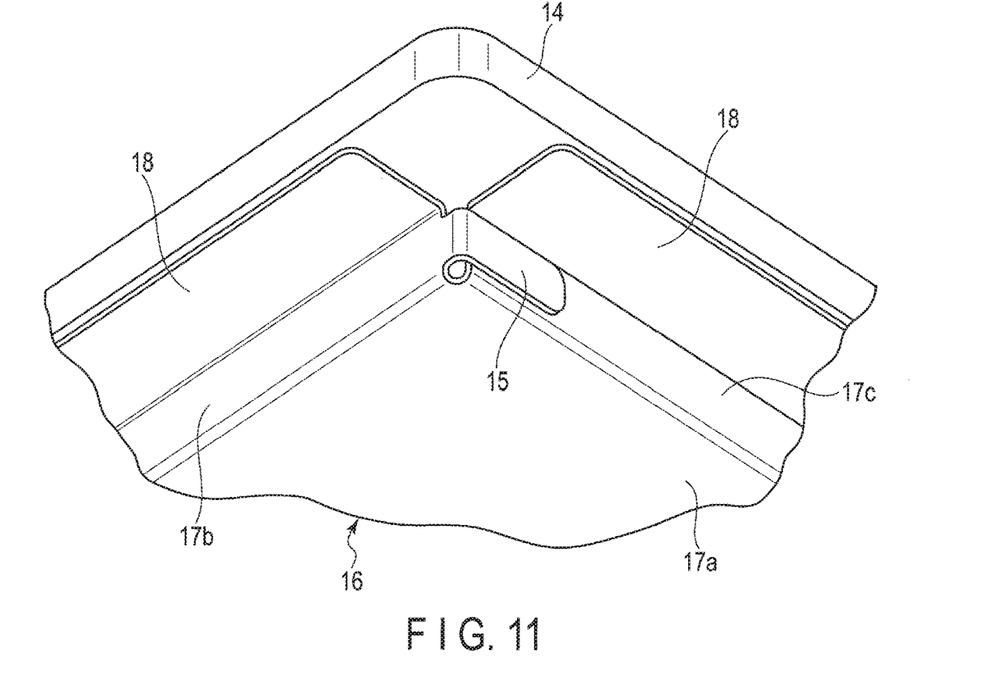
FIG. 11 is an enlarged perspective view showing the corner portion of the container case of the liquid crystal display device.

FIG. 8 is a perspective view of the container case formed by bending the reflective sheet RE. FIG. 9, FIG. 10, and FIG. 11 are enlarged perspective views showing a part of the container case.

As shown in FIG. 8 to FIG. 11, the sidewalls 17b and 17c of the container case 16 are bent at substantially right angles along the side edges of the bottom wall 17a. The flanges 18 are bent at substantially right angles along the upper edges of the sidewalls 17b and 17c and outward with respect to the bottom wall 17a. That is, the container case 16 comprises the rectangular bottom wall 17a, the pair of sidewalls 17b on the long sides and the pair of the sidewalls 17c on the short sides, which are provided to stand along the respective side edges of the bottom wall 17a, and the flanges 18 extending outward from the upper edges of the respective sidewalls. In the present embodiment, the sidewalls 17b on the long sides are provided to stand substantially perpendicular to the bottom wall 17a, and extend over the total length of the long sides of the bottom wall 17a. The sidewalls 17c on the short sides are provided to stand substantially perpendicular to the bottom wall 17a, and extend over the total length of the short sides of the bottom wall 17a. The opening portion 26 for passing interconnects is formed in one of the sidewalls 17c. The sidewalls 17b and 17c have a height h that is slightly greater than the sum of the thickness of the liquid crystal display panel 12 and the thickness of the backlight unit 20 (except for the thickness of the bottom wall 17a), which will be described later.

The flanges 18 extend substantially perpendicular to the sidewalls 17b and 17c and outward. In the present embodiment, the flanges 18 are provided over the total length of each of the sidewalls 17b and 17c. The flanges 18 have a width W that enables to put an adhesive sufficiently, for example, 0.7 to 1 mm, to be obtained.

Each of the tongue portions 15 projecting from the sidewalls 17b is bent at substantially right angles at their base ends, and adheres to or is welded to an end portion of an adjacent one of the sidewalls 17c. That is, the tongue portions 15 cover gaps at joints between the adjacent sidewalls 17b and 17c at four corner portions of the container case 16. At the same time, the tongue portions 15 couple the adjacent sidewalls 17b and 17c to each other. The respective inner surfaces of the bottom wall 17a and the sidewalls 17b and 17c formed of the reflective sheet RE form reflective surfaces.

As shown in FIG. 9, the sidewall 17c may be reinforced by mounting a rodlike reinforcing member 27 on the inner surface or the outer surface of the sidewall 17c, in the case that the formation of the opening 26 reduces the rigidity of the sidewall 17c.

As shown in FIG. 2, FIG. 4, FIG. 6, and FIG. 11, the container case 16 having the above-described structure is fixed to the cover panel 14 by attaching the flanges 18 to the lower surface of the cover panel 14 with double-sided tape 24, and covers the liquid crystal display panel 12. The flanges 18 of the sidewalls 17b and 17c are fixed to the periphery of the lower surface of the cover panel 14 outside the liquid crystal display panel 12, and arranged along the respective sides of the cover panel 14. The bottom wall 17a of the container case 16 is opposed to the rear surface of the liquid crystal display panel 12 and substantially parallel to the rear surface of the liquid crystal display panel 12 with a gap therebetween. The three sidewalls 17b and 17c other than one of the sidewalls 17c on the short sides of the container case 16 are opposed to the corresponding side edges of the liquid crystal display panel 12 with an extremely small gap therebetween. As shown in FIG. 5, the above one of the sidewalls 17c on the short sides is opposed to the short side of the liquid crystal display panel 12 with a gap therebetween, which is relatively larger than a gap C between the other sidewalls and the liquid crystal display panel 12. In the sidewall 17c and the flange 18, the opening portion 26 is formed, and the flexible printed circuit FPC (interconnects) extending from the liquid crystal display panel 12 is inserted into the opening portion 26 and extends to the outside of the container case 16.

A hot-melt adhesive, an epoxy adhesive, a UV curing adhesive, etc., as well as the double-sided tape 24, can be used to fix the container case 16 and the cover panel 14.

As shown in FIG. 3 to FIG. 5, the backlight unit 20 comprises optical members stored in the container case 16. The optical members include a lightguide plate LG in the shape of a rectangular plate, optical sheets OS stacked on the lightguide plate LG, and a light source unit 30 which emits light to the lightguide plate LG.

The lightguide plate LG comprises a first main surface S1 which is a light exit surface, a second main surface S2 on the opposite side to the first main surface S1, and an incidence end face EF connecting the first main surface S1 and the second main surface S2. The lightguide plate LG is overlaid on the bottom wall 17a formed of the reflective sheet RE in a state in which the second main surface S2 is opposed to the bottom wall 17a of the container case 16. The optical sheets OS have light transmitting properties, and are disposed to be stacked on the first main surface S1 of the lightguide plate LG. In the present embodiment, a diffusion sheet OS1, a prism sheet OS2, and a diffusion sheet OS3 formed of synthetic resin, for example, polyethylene terephthalate, are used as the optical sheets OS. The optical sheets OS are formed into rectangles with substantially the same dimensions, and are disposed to be stacked in order on the first main surface S1 of the lightguide plate LG. In addition, the optical sheets OS are opposed to the rear surface of the liquid crystal display panel 12 with a small gap therebetween, and are opposed to the whole display area DA of the liquid crystal display panel 12.

The lightguide plate LG and the optical sheets OS are disposed on the bottom wall 17a without adhering to each other or adhering to the container case 16. Moreover, the optical sheets OS are disposed in the container case 16 without adhering to the liquid crystal display panel 12. For the backlight unit 20, no dedicated resin frame for holding the lightguide plate LG is used.

The optical sheets OS and the lightguide plate LG are formed to have dimensions (width and length) slightly smaller than those of the bottom wall 17a of the container case 16. At least three side edges of each of the optical sheets OS and the lightguide plate LG, except a side edge on the light source side, are directly opposed to the sidewalls 17b and 17c of the container case 16 with a predetermined gap (clearance) C therebetween, that is, are opposed to the sidewalls 17b and 17c without a resin frame, etc., interposed therebetween. Accordingly, each of the optical sheets OS1, OS2, and OS3, and the lightguide plate LG are disposed, such that they can be relatively displaced in a planar direction by at least the gap C with respect to the container case 16 and the liquid crystal display panel 12.

The gap C is set in consideration of the properties and the coefficients of thermal expansion of components of the backlight unit 20. For example, the gap C in the short-side direction of the optical sheets OS is greater than or equal to (the length of) the short side of the optical sheets OS×1.7× $10^{-6}$ mm, and the gap C in the long-side direction of the optical sheets OS is greater than or equal to (the length of) the long side of the optical sheets×$1.7 \times 10^{-6}$ mm. If the gap C is too wide, such problems as a reduction in a frame narrowing effect of the liquid crystal display panel 12, excessive movement of each component, and deterioration of appearance (state in which the edges of the backlight unit are visible from outside) will occur. Therefore, the gap C is set to be less than or equal to half the width of the frame area ED of the liquid crystal display panel 12.

Accordingly, a deformation (expansion and contraction) of the components of the backlight unit 20 due to a temperature change, and a movement of the components made by the deformation are allowed because of the existence of the gap C. The occurrence of a distortion of the optical sheets OS, etc., due to this kind of deformation is prevented. Irrespective of a temperature state, the quality of transmitted light of the backlight unit can be maintained and deterioration of the display of the liquid crystal display panel 12 can be prevented. It is preferable that the gap C be secured between the side edges (side edges of four sides in the present embodiment) of each of the components of the backlight unit 20 and the sidewalls 17b and 17c of the container case 16. In this point, in consideration of an accommodation state, the components of the backlight unit 20, for example, the optical sheets OS are independently disposed, such that they can be displaced. Thus, it can also be assumed that the optical sheets OS are disposed at a position at which one side edge thereof contacts the sidewall 17b or 17c of the container case 16. In this case, the other side edges of the optical sheets OS are opposed to the sidewalls 17b and 17c with a gap therebetween, which is twice as large as the gap C. Also in this case, the appearance does not deteriorate, because the thermal expansion of the optical sheets OS can be absorbed by twice the gap C, and twice the gap C falls within the range of the width W of the frame area ED.

As shown in FIG. 5, the light source unit 30 comprises light-emitting diodes LD functioning as a light source, a rodlike support frame 36 supporting the light-emitting diodes LD, etc. The light source unit 30 is disposed on the reflective sheet RE in the container case 16, and located between the lightguide plate LG and the sidewalls 17c of the container case 16. The light-emitting diodes LD are disposed to be opposed to the incidence end face EF of the lightguide plate LG. A flexible circuit board FWP for supplying electricity to the light-emitting diodes LD is attached to an end portion of the lightguide plate LG and the support frame 36 with double-sided tape 35. Each of the light-emitting diodes LD is electrically connected to the flexible circuit board FWP. The flexible circuit board FWP extends from one end of the lightguide plate LG, and is drawn outside through the opening portion 26 formed in the sidewall 17c of the container case 16. Light that exits from the light-emitting diodes LD enters the lightguide plate LG from the incidence end face EF of the lightguide plate LG, travels in the lightguide plate LG, and exits from the whole first main surface (light exit surface) S1 to the liquid crystal display panel 12 side. The exiting light is diffused by the optical sheets OS, and then radiated to the liquid crystal display panel 12. In addition, light escaping from the second main surface S2 and the side surfaces of the lightguide plate LG is reflected by the inner surface of the bottom wall 17a and the inner surfaces of the sidewalls 17b and 17c of the container case 16 formed of a reflective sheet, and is returned to the lightguide plate LG.

As shown in FIG. 5, one end portion of the lowest optical sheet OS is drawn to the flexible circuit board FWP, and fixed to the flexible circuit board FWP. The optical sheets OS are thereby positioned. It should be noted that the optical sheets OS may simply be disposed on the lightguide plate LG without being fixed to any other members.

As described above, the optical members of the backlight unit 20 are arranged in the container case 16, and held opposed to the liquid crystal display panel 12 by the container case 16. In addition, the backlight unit 20 does not adhere to the liquid crystal display panel 12 and the container case 16, and is positioned by the container case 16 in the state of being allowed to slightly move in a planar direction.

As a result, the components of the backlight unit 20 can be relatively displaced without interference with the container case 16 and the liquid crystal display panel 12, even if they are extended by thermal expansion, etc.

The liquid crystal display device 10 can be assembled by, for example, the following process. Initially, in a state in which the cover panel 14 is positioned with respect to the liquid crystal display panel 12, the cover panel 14 is attached to the display surface 12a side of the liquid crystal display panel 12 with the adhesive AD. Then, adhesive or double-sided tape for fixing the container case 16 is applied or attached to the periphery of the cover panel 14, that is, a marginal portion in the shape of a frame. On the other hand, the above-described reflective sheet RE is bended to form the container case 16, and further, each of the tongue portions 15 is fixed to an adjacent one of the sidewalls 17c. Next, the lightguide plate LG and the optical sheets OS, which are optical members of the backlight unit 20, are sequentially disposed, that is, dropped, to be stacked on the bottom wall 17a of the container case 16. At this time, it is unnecessary to fix the optical members by adhesive, etc., and it suffices if they are sequentially disposed in the container case 16 without being particularly positioned. Thus, the optical members can be easily placed.

Figure 12:
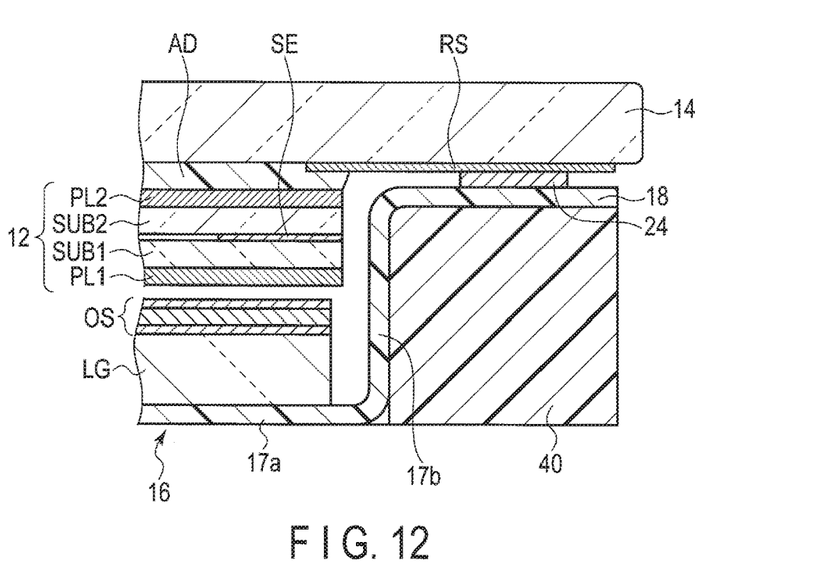
FIG. 12 is a sectional view of the liquid crystal display device in a state in which a temporary frame is mounted on the container case in an assembly process.

As shown in FIG. 12, for example, the container case 16 may be attached in advance to a rectangular temporary frame (sacrificial frame) 40 formed of synthetic resin to support the outer surfaces of the sidewalls 17b and 17c and the bottom surfaces of the flanges 18 of the container case 16, if the rigidity of the container case 16 is problematically insufficient. In a state in which the container case 16 is reinforced by the temporary frame 40, the optical members are disposed in the container case 16.

Next, the liquid crystal display panel 12 and the cover panel 14 are positioned with respect to the container case 16 accommodating the backlight unit 20, and then, the liquid crystal display panel 12 is dropped in the container case 16. In this state, the flanges 18 of the container case 16 are attached to the periphery of the lower surface of the cover panel 14 with adhesive or the double-sided tape 24. After the container case 16 is fixed to the cover panel 14, the temporary frame 40 is removed. The liquid crystal display device 10 is thereby obtained. If a device in which the liquid crystal display device 10 is installed permits, all or part of the temporary frame 40 may be left around the container case 16.

Figure 13:
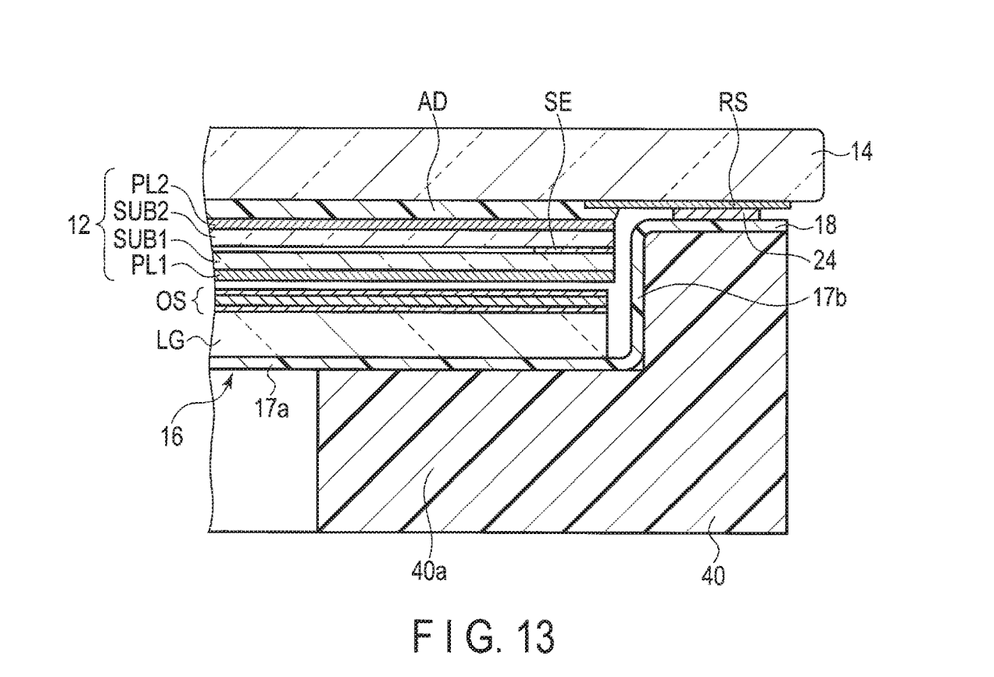
FIG. 13 is a sectional view of the liquid crystal display device in a state in which a temporary frame according to a modification is mounted on the container case in the assembly process.

FIG. 13 is a sectional view showing a temporary frame (sacrificial frame) according to a first modification. The temporary frame 40 may integrally comprise an inner peripheral frame portion 40a supporting the bottom wall 17a of the container case 16. That is, the temporary frame 40 may support the periphery of the bottom wall and the outer surfaces of the sidewalls and the inner surfaces of the flanges of the container case 16. By using the temporary frame 40, the handleability of the container case 16 at the time of assembly is improved.

In the liquid crystal display device 10 according to the present embodiment having the above-described structure, the optical members are accommodated and held in the container case 16 formed of a reflective sheet or reflective film, whereby a conventional mold frame and a conventional sheet metal case can be omitted. Because the number of components is thus reduced, a backlight unit and a liquid crystal display device which are even thinner and have a narrow frame can be provided at low prices. According to the present embodiment, the fixing of the backlight unit 20 to the liquid crystal display panel 12 can be eliminated by adopting the structure in which the flanges 18 of the container case 16 are fixed to the cover panel 14. Accordingly, even if the frame area ED of the liquid crystal display panel 12 is narrowed, the area for fixing can be sufficiently secured by fixing the container case 16 and the cover panel 14 to each other, and firm fixing can be achieved. At the same time, a space for fixing the liquid crystal display panel 12 and the backlight unit 20, which has conventionally been secured in the frame area, is eliminated. Thus, the liquid crystal display panel 12 with a remarkably narrowed frame, in which the width of the frame area ED is, for example, less than 0.8 mm, can be achieved.

The reflective sheet or the reflective film constituting the container case 16 has a film thickness of 200 µm or less, preferably, 50 to 90 µm, and the bottom wall, the sidewalls, and the flanges of the container case 16 can be thinly formed. Therefore, when the liquid crystal display device 10 is incorporated into an electronic device set, etc., the thickness of the electronic device can be minimized.

In the assembly of the liquid crystal display device 10, it suffices if the components of the backlight unit 20 are disposed and stacked in the container case 16 without adhering thereto. Thus, the liquid crystal display device 10 can be easily and surely assembled. Furthermore, because the area in which the container case 16 and the cover panel 14 are fixed to each other can be set relatively large, many options for a fixing member are available in addition to double-sided tape and adhesive.

Liquid crystal display devices according to other embodiments will be next described. In the other embodiments described hereinafter, the same portions as those of the above-described first embodiment will be given the same reference numbers and a detailed description thereof will be omitted. Portions differing from those of the first embodiment will mainly described in detail.

(Second Embodiment)

Figure 14:
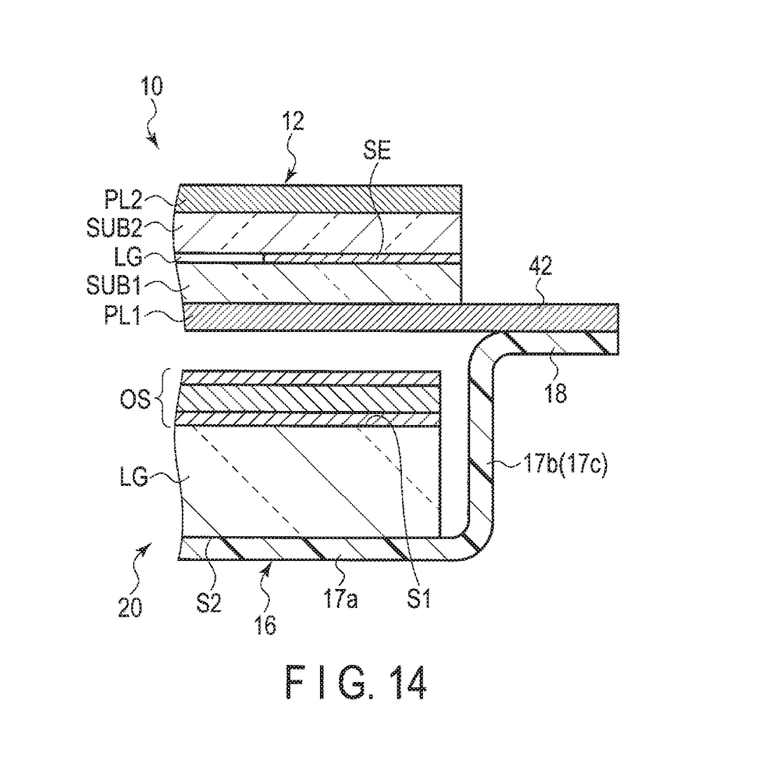
FIG. 14 is a sectional view showing a part of a liquid crystal display device according to a second embodiment.

FIG. 14 is a sectional view showing a part of a liquid crystal display device according to a second embodiment. According to the present embodiment, a container case 16 of a backlight unit 20 is formed by, for example, using a white polyethylene terephthalate (PET) film having a film thickness of 65 μm and reflectivity of approximately 98% as a reflective film. The container case 16 in which a rectangular bottom wall 17a, four sidewalls 17b and 17c standing along the respective side edges of the bottom wall 17a, and flanges 18 extending outward from the respective sidewalls are integrally provided is formed by vacuum-forming the rectangular white PET film with a metal mold.

The backlight unit 20 comprises a lightguide plate LG disposed on the bottom wall 17a in the container case 16 and optical sheets OS disposed to be stacked on a light exit surface S1 of the lightguide plate LG.

A polarizer PL1 of a liquid crystal display panel 12 is formed to have greater dimensions (length and width) than those of a first substrate SUB1, and a periphery 42 of the polarizer PL1 extends outward from an outer edge of the first substrate SUB1. The container case 16 accommodating optical members is disposed to be opposed to the polarizer PL1 of the liquid crystal display panel 12, and each of the flanges 18 is fixed to the periphery 42 of the polarizer PL1. In the present embodiment, the flanges 18 are thermally welded to the periphery 42 of the polarizer PL1. In general, the polarizer is formed by stacking synthetic resin layers. Thus, the flanges 18 of the container case 16 formed of a reflective film of synthetic resin can be easily welded to the polarizer. A cover panel may be provided on a polarizer PL2 of the liquid crystal display panel 12.

According to the second embodiment having the above-described structure, a conventional mold frame and a conventional sheet metal case can be omitted by forming the container case 16 of a reflective film. Thus, the backlight unit 20 can be made thinner, and the whole liquid crystal display device 10 can be made thinner. Because the flanges 18 of the container case 16 and the polarizer are fixed by welding, a fixing member such as double-sided tape need not be provided therebetween. Accordingly, the manufacturing cost can be reduced, and the liquid crystal display device can be made even thinner. Moreover, if the container case 16 is molded by vacuum forming, the sidewalls can be formed to be even shallower. Accordingly, a thin lightguide plate having a thickness of 0.2 mm or less can be used, and the backlight unit and the liquid crystal display device can be made even thinner.

In addition, also in the second embodiment, the same advantages as those of the above-described first embodiment can be obtained.

(Third Embodiment)

Figure 15:
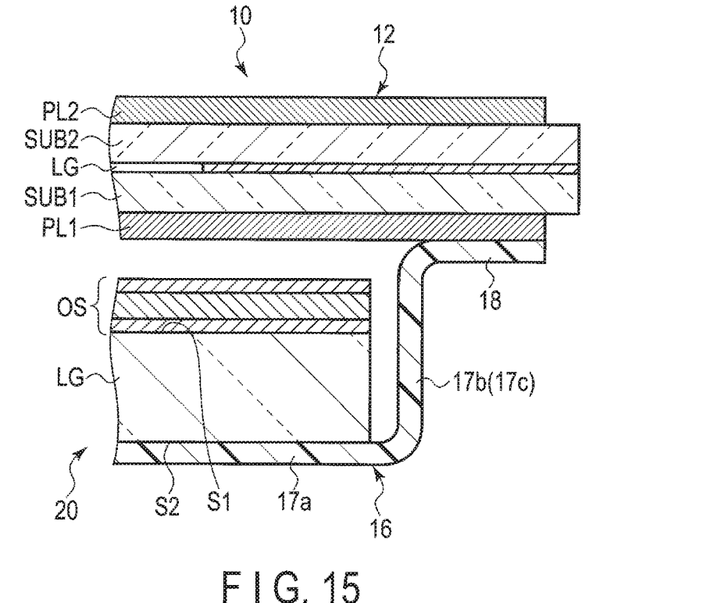
FIG. 15 is a sectional view showing a part of a liquid crystal display device according to a third embodiment.

FIG. 15 is a sectional view showing a part of a liquid crystal display device according to a third embodiment. According to the present embodiment, a container case 16 of a backlight unit 20 is formed by, for example, using a white PET film having a film thickness of 65 μm and reflectivity of approximately 98% as in the case of the second embodiment. The container case 16 in which a rectangular bottom wall 17a, four sidewalls 17b and 17c standing along the respective side edges of the bottom wall 17a, and flanges 18 extending outward from the respective sidewalls are integrally provided is formed by vacuum-forming the rectangular white PET film with a metal mold. The bottom wall 17a of the container case 16 is formed to have smaller dimensions than those of a liquid crystal display panel 12.

The container case 16 accommodating optical members is disposed to be opposed to a polarizer PL1 of the liquid crystal display panel 12, and each of the flanges 18 is fixed to the periphery of the polarizer PL1. In the present embodiment, the flanges 18 are ultrasonically welded to the periphery of the polarizer PL1.

A cover panel may be provided on a polarizer PL2 of the liquid crystal display panel 12.

According to the third embodiment having the above-described structure, a conventional mold frame and a conventional sheet metal case can be omitted by forming the container case 16 of a reflective film. Thus, the backlight unit 20 can be made thinner, and the whole liquid crystal display device 10 can be made thinner. Because the flanges of the container case and the polarizer are fixed by welding, a fixing member such as double-sided tape need not be provided therebetween. Accordingly, the manufacturing cost can be reduced, and the liquid crystal display device can be made even thinner. In addition, also in the third embodiment, the same advantages as those of the above-described second embodiment can be obtained.

(Fourth Embodiment)

Figure 16:
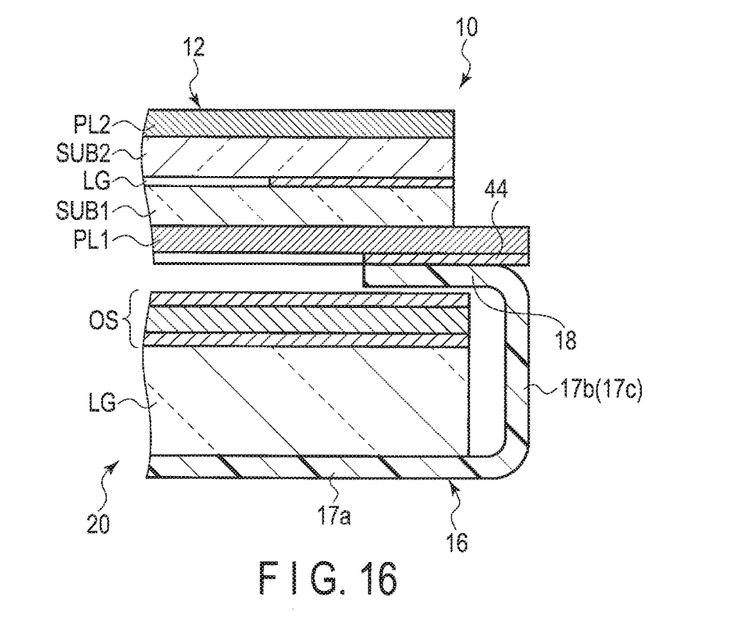
FIG. 16 is a sectional view showing a part of a liquid crystal display device according to a fourth embodiment.

FIG. 16 is a sectional view showing a part of a liquid crystal display device according to a fourth embodiment. According to the present embodiment, a container case 16 of a backlight unit 20 is formed by, for example, bending a reflective sheet having a film thickness of 65 to 82 μm and reflectivity of 98% or more. A rectangular bottom wall 17a, four sidewalls 17b and 17c standing along the respective side edges of the bottom wall 17a, and flanges 18 extending from the respective sidewalls are integrally provided. In the present embodiment, each of the flanges 18 is bent toward the inside of the bottom wall 17a with respect to the sidewalls, and is opposed and substantially parallel to the bottom wall 17a.

In the assembly of a liquid crystal display device 10, a lightguide plate LG, optical sheets OS, and a light source unit not shown in the figures are disposed on the bottom wall 17a of the container case 16, and then, each of the flanges 18 is bend inward. The container case 16 accommodating optical members is disposed to be opposed to a polarizer PL1 of a liquid crystal display panel 12, and each of the flanges 18 is fixed to the periphery of the lower surface of the polarizer PL1 by adhesive 44 or double-sided tape.

According to the fourth embodiment having the above-described structure, a conventional mold frame and a conventional sheet metal case can be omitted by forming the container case of a reflective film. Thus, the backlight unit 20 can be made thinner, and the whole liquid crystal display device 10 can be made thinner. Moreover, since the flanges of the container case 16 are bent inward, the frame of the liquid crystal display device can be made even narrower.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes that can be implemented by a person with ordinary skill in the art through arbitrary design changes based on the structures and manufacturing processes described above as the embodiments of the present invention are included in the scope of the present invention as long as they encompass the spirit of the present invention. For example, the liquid crystal display panel may not be attached to the cover panel in the initial process, but the liquid crystal display panel may be accommodated in the container case with the backlight unit accommodated therein, and then be attached to the cover panel together with the flanges of the container case. Alternatively, the liquid crystal display panel may not adhere to the cover panel, such that it is slightly movable in the container case. Furthermore, the liquid crystal display panel may be fixed to the backlight unit, and the liquid crystal display panel and the backlight unit fixed to each other may be accommodated in the container case.

Furthermore, other advantages that can be obtained by the above-described embodiments and are obvious from the description of this specification or can be conceived by a person with ordinary skill in the art as appropriate are naturally acknowledged as advantages of the present invention.

The reflective sheet or the reflective film forming the container case is not limited to those of the above-described embodiments. Various other materials such as a porous polypropylene film can be selected. The flanges of the container case are continuously provided over the total length of each of the sidewalls. However, if the rigidity of the container case is sufficient, the flanges may be intermittently provided in a longitudinal direction of the sidewalls.

The number of optical sheets of the backlight unit is not limited to three, and may be increased or reduced as necessary. The shapes of the liquid crystal display panel, the components of the backlight unit, and the container case are not limited to rectangles, but may be other shapes such as an ellipse and a track shape. Materials used for the components are not limited to the above-described examples and may be selected from various options.

What is claimed is:

1. A liquid crystal display device comprising:
a liquid crystal display panel; and
an illumination device arranged on a rear surface side of the liquid crystal display panel, the illumination device comprising a container case which is formed of a reflective sheet or reflective film and fixed to the liquid crystal display panel, and an optical member which is disposed in the container case and opposed to the liquid crystal display panel,
wherein the container case comprises a bottom wall, sidewalls standing along side edges of the bottom wall, flanges extending from the sidewalls and fixed to the liquid crystal display panel, and tongue portions, the bottom wall, the sidewalls, the flanges, and the tongue portions are formed of the reflective sheet or reflective film and are integrally formed with each other, each of the tongue portions extending from at least one end of one of the sidewalls, being bent at a base end on a sidewall side, being fixed to an end portion of another one of the sidewalls, and covering a joint between the sidewalls adjacent to each other.

2. The liquid crystal display device of claim 1, wherein the liquid crystal display panel comprises a display surface, a rear surface opposed to the display surface, and a polarizer on the rear surface, and the flanges are fixed to the polarizer.

3. The liquid crystal display device of claim 1, wherein each of the flanges extends to an outside of the bottom wall with respect to the sidewalls.

4. The liquid crystal display device of claim 1, wherein each of the flanges extends to an inside of the bottom wall with respect to the sidewalls.

5. A liquid crystal display device comprising:
a liquid crystal display panel;
a cover panel overlaid on a display surface of the liquid crystal display panel; and
an illumination device arranged on a rear surface side of the liquid crystal display panel, the illumination device comprising a container case which is formed of a reflective sheet or reflective film and comprises a bottom wall, sidewalls standing along side edges of the bottom wall, flanges extending from the sidewalls, and tongue portions,
wherein the bottom wall, the sidewalls, the flanges, and the tongue portions are formed of the reflective sheet or reflective film and are formed integrally with each other, each of the tongue portions extending from at least one end of one of the sidewalls, being bent at a base end on a sidewall side, being fixed to an end portion of another one of the sidewalls, and covering a joint between the sidewalls adjacent to each other,
the illumination device further comprising a light guide plate located in the container case on the bottom wall, and
wherein the flanges are fixed to the cover panel and the liquid crystal display panel is in the container case and opposed to the light guide plate.

6. The liquid crystal display device of claim 5, wherein the sidewalls are formed of bent portions of the reflective sheet or reflective film, and
the flanges are formed by bending a part of each of the sidewalls.

7. The liquid crystal display device of claim 5, wherein each of the flanges extends to an outside of the bottom wall with respect to the sidewalls.

8. The liquid crystal display device of claim 5, wherein the cover panel comprises a first surface and a second surface opposed to the first surface; the liquid crystal display panel is attached to the second surface of the cover panel; and the flanges are fixed to the second surface and located around the liquid crystal display panel.

9. The liquid crystal display device of claim 5, wherein one of the sidewalls comprises an opening portion into which a line is inserted.

10. The liquid crystal display device of claim 5, wherein the container case comprises a reinforcing member configured to reinforce the one of the sidewalls having the opening portion.

* * * * *